Dec. 6, 1927.
J. BINDON
1,651,943
AUTOMOBILE ACCESSORY
Filed Feb. 24, 1926  2 Sheets-Sheet 1
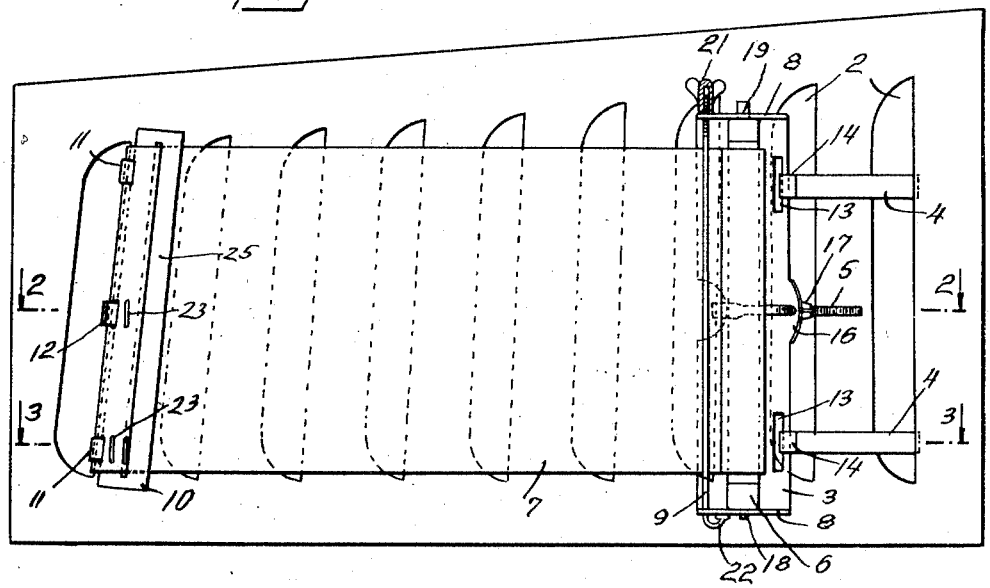
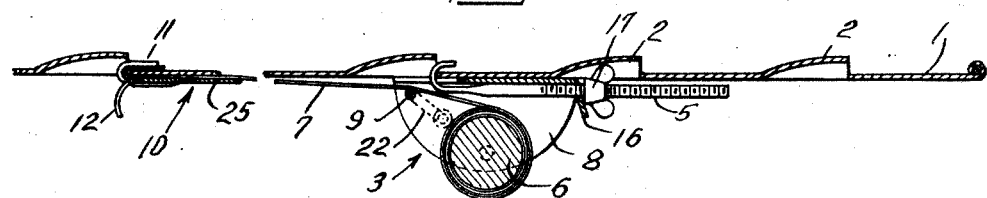
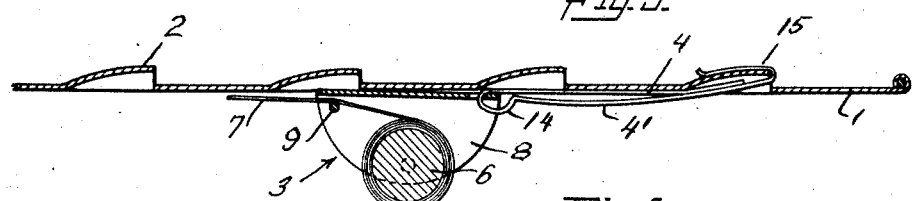
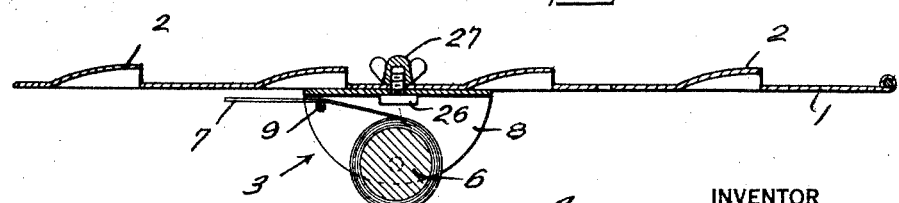
INVENTOR
James Bindon
BY
ATTORNEYS Dec. 6, 1927.
J. BINDON
1,651,943
AUTOMOBILE ACCESSORY
Filed Feb. 24, 1926    2 Sheets-Sheet 2
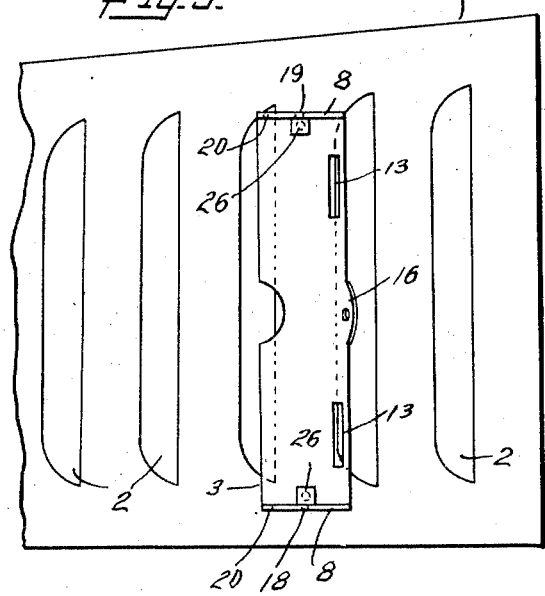
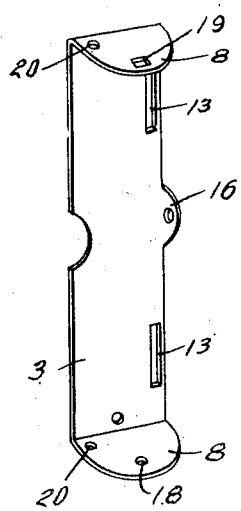
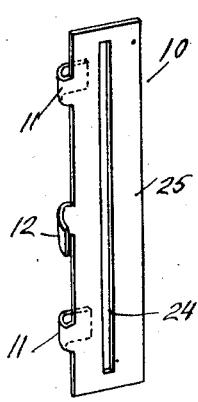
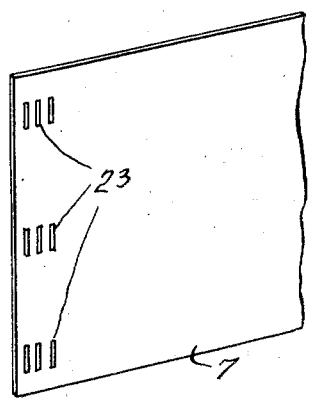
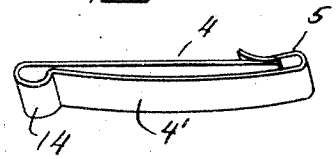
INVENTOR
James Bindon
BY
ATTORNEYS Patented Dec. 6, 1927.

1,651,943

UNITED STATES PATENT OFFICE.

JAMES BINDON, OF NEWPORT, RHODE ISLAND.

AUTOMOBILE ACCESSORY.

Application filed February 24, 1926. Serial No. 90,237.

This invention relates to automobile hood curtains. More particularly it relates to curtains for regulating the degree of ventilation and passage of air through the side vents or louvres of automobile hoods.

Water-cooled automobile engines as constructed at the present time all employ a form of air-cooled water reservoir ordinarily termed a radiator. Usually such radiator is at the forward end of the automobile hood to obtain the advantage of a greater inrush of air through its cooling surfaces. Although a natural inrush of air occurs due to the forward motion of the vehicle, mechanical means in the form of a suction fan is also used to insure a steady stream of cooling air.

Such air must find an outlet after being drawn through the radiator and over the engine surfaces. For that reason vents or louvres are placed in the side walls of the hood. The cold air, drawn in through the radiator, is warmed in passing through, further heated in passing over the hot engine surfaces, and drawn off partly through the louvres and partly through the opening at the rear end of the engine crank case. In warm weather it is decidedly advantageous to remove the heated air as quickly as possible from the vicinity of the engine. In cold weather, however, the exact opposite is true. When the automobile is operated, air must still be drawn in through the radiator to cool the circulating water, but the engine must not be cooled down too far by the removal of its radiated heat. It is therefore advisable to adopt some means whereby some of the radiated engine heat will be retained within the hood and not drawn off by the current of air. To retain all is as objectionable as to retain none. Regulation of but one of the air escapes, either the side vents in the hood or the open rear end at the lower edge of crank case, is sufficient. Obviously, the regulating of the vents is the easier of the two. In addition, any means for retaining the engine heat within the hood when the car is stopped in cold weather is a decided advantage. Cross drafts through the hood vents carry away the radiated heat of the motor. Snow or rain driven into the hood through the rearwardly open vents chills the motor and sometimes damages the engine. After a few hours, the difficulty in starting is too apparent to need emphasis.

I have, therefore, constructed a type of vent regulator which is well adapted for the purposes above mentioned and yet is extremely simple in both operation and construction. Since the fewer the obstructions to air passage in warm weather the better, I have made my device detachable; and in making it detachable I have used several features not found in any other type of vent regulator. For cold weather driving it is easily applied; for warm weather driving it is just as easily removed; and for driving in any weather at all, it provides a definite and variable adjustment of the degree of air passage through the hood vents.

In general, my type of regulator is constructed in the form of a rolled curtain extensible over all the louvres or any desired number of them. Such portion of the curtain as is not actively used to cover the vents desired is compactly rolled upon a spring roller at one end of the hood. The entire device including roller, fasteners and curtain is enclosed within the hood and so attached to the side sections thereof that it does not interfere with their opening and closing. Each side section carries the unit mounted on its inner wall independent of the rest of the hood and unnoticeable from the outside.

For a better understanding of the invention, reference is made to the following drawings wherein:

Fig. 1 is a side elevation of a hood section carrying one form of my device.

Fig. 2 is a sectional view on the line 2—2 of Fig. 1.

Fig. 3 is a sectional view on the line 3—3 of Fig. 1.

Fig. 4 is a form of attachment different from that shown in Fig. 1.

Fig. 5 is a side elevation showing the form of attachment shown in Fig. 4.

Fig. 6 is a perspective view of the roller bracket.

Fig. 7 is a perspective view of the hook plate attached in use to the end of the curtain.

Fig. 8 is a perspective view of a section of the curtain itself.

Fig. 9 is a perspective view of one of the spring clips used to secure the roller bracket to the hood section.

More in detail, a representative type of hood side section is shown at 1 in Fig. 1. The louvres or vents 2 are here depicted as tapering from front to back and slanting somewhat at the forward end. Although present forms of louvres are either nearly all vertical or slanting and of uniform length, this particular form is used merely to show the applicability of the invention to either form with the same degree of success. The bracket carrying the roller is indicated at 3 attached to the rearward end of the hood section by the spring clips 4 and the threaded hook 5. The roller 6 carrying the curtain 7 is mounted between the shoulders 8 of the bracket under the compression of the guide rod 9. At its free end the curtain has adjustably attached to it a slotted hook plate 10 fitted with bent ears 11 to hook behind the edge left in the hood section by the flaring of the louvres, and bent ear 12 to be used as a handle.

The sectional views of Fig. 2 and Fig. 3 taken together more clearly show the manner of attaching the roller bracket 3 to the hood section so that there will be no unsightly outward evidences of the use of the device. The spring clips 4 are hooked through the slots 13 in the roller bracket 3 (Figs. 6 and 1), and pulled up until the enlarged ends 14 (Fig. 9) are positioned in the slots (Figs. 3 and 1). The spring ends 15 are then clipped around the flared edges of the louvres 2 (Fig. 3). The ends 15 are thus the only part of the clips that show, and when finished in the same manner as the hood are quite unnoticeable. Hooked behind the straight edge in the hood section left by the flaring of the louvres is the threaded hook clamp 5 having its threaded end inserted through a hole in the bent lip 16 of the bracket 3 (Figs. 6, 1 and 2). A wing nut 17 easily tightened by the fingers draws up the bracket 3 against the action of the spring clips 4. The bowed leaf 4' of the clip (Fig. 9) is somewhat straightened under the tensioning action of the tightened hook 5 and exerts a constant pull on the bracket in the opposite direction resulting in a firm, rattle-proof mounting of the bracket on the hood section.

The spring roller 6 is mounted between the shoulders 8 of the bracket 3 (Figs. 6 and 1) with the customary free pivot 18 and locked pivot 19. The roller is not ratcheted, but always under the twisting action of the coiled spring within it. The advantage of this will be explained later. The shoulders 8 are bent up from the same sheet as the base of the bracket 3 and are thus capable of being sprung apart to allow insertion of the roller 6. Mounted in the holes 20 in the shoulders 8 of the bracket is a guide rod 9. The position of the holes 20 is such that the curtain, when curved around and under the rod 9, lies very close to the wall of the hood section. Since the tension in the curtain due to the spring roller has a tendency to throw the rod away from the hood wall, it is necessary that some means be employed to tighten the rod. I have done this by threading one end of the rod and attaching a wing nut 21 thereto that can be easily turned with the fingers. The other end of the rod I have bent over to form an arch 22. Since the shoulders 8 are of spring sheet steel, a tightening of the rod at a point near the base has the tendency to flare out the end in which the roller 6 is mounted, due to the location of the tightening point between the two fulcrums produced by the base of the shoulder and the pivotal point of the roller. By bending the rod to form the arch 22, any tightening force is transmitted to a point very near to the bearing of the roller 6, and thus no flaring of the shoulders will occur. The tension necessary in the rod to keep it stiff against the constant pull of the curtain is thus also applied to keep the shoulders in firm rigid position for the bearing of the roller 6.

By having a spring roller without ratchets, the curtain 7 is always under tension and will maintain a smooth, taut surface in any adjusted position. This is of decided advantage because the constant rush of air through the hood when the automobile is moving has a tendency to produce a fluttering of the curtain unless it is kept tight. A very strong spring in the roller is therefore preferable. To overcome fire hazard and the danger incident to the curtain becoming oily or greasy, the fabric is specially treated to render it fireproof. As a further safeguard against general deterioration and rotting due to the curtain being wet when rolled up, the material is thoroughly waterproofed. Rain or snow and such oil or grease as might accumulate on the curtain and render it wet and undesirable can thus have no effect upon the durability of the fabric. Another feature is that, if so desired, the roller and curtain may be removed and thoroughly cleaned, if necessary, without harm to the material.

The end of the curtain to which the hook plate 10 is attached is provided with a series of parallel slits 23 (Fig. 8). Into these slits the hooking ears 11 and handle 12 are inserted in any one of a number of positions, depending upon the formation of the louvres 2. If the vents are vertical, the ears 11 and handle 12 are inserted in the same vertical set of slits. If the vents are slanting, forward or backward, the ears and handle are inserted into one slit in each of the vertical sets. Thus the forward edge of the curtain is either vertical or slanting, depending upon the particular form of the vents, and the curtain will always maintain a tight surface because the forward edge coincides with the edge behind which the ears 11 are hooked.

The hook plate 19 (Fig. 7) is provided with a slot 24 through which the curtain is threaded before being hooked over the bent ears 11 and handle 12. The edge 25 thus bears on the fabric and holds it tightly against the hood wall. The ears 11 are hooked back of the edge of the hood left by the flaring of the louvres, and the handle 12 bent up to provide an ear that can be gripped by the fingers to change the location of the hook plate. The ears 11 are formed to present as little surface outside of the hood as possible. In any adjusted position, they, together with the curved ends of the spring clips, are the only parts of the device that appear outside of the hood. When finished in the color of the hood they are practically unnoticeable. The entire device can thus be applied to a hood in a secure and rigid position without marring the finish or beauty of the hood.

At times it may be desirable to permanently secure the roller bracket to the hood section. In that case the spring clips are eliminated and the bracket bolted directly to the hood as shown in Fig. 4. The form of the bracket is the same as before, except that bolts 26 and wing nuts 27 now secure the bracket. In warm weather, such an installation may be left in place and the roller with the hook plate and curtain removed. The guide rod may also be removed, but if left in place it helps to keep the shoulders 8 from being bent. If an absolutely permanent installation is desired, the bracket may be riveted to the smooth unvented surface between the last vent and the rear edge of the hood. In such a position the curtain may be drawn over all of the vents when desired, or any number of them. In warm weather, the dismantled bracket is out of the way and yet available at all times.

By a slight change in the ends 15 of the spring clips of Fig. 9, the bracket 3 may be positioned at the unvented portion between the last vent and the rear edge of the hood by slipping the clips 4 over the rear edge of the hood section instead of over the edge of the louvres. In either case, the curtain may be extended to cover one or all of the vents in the hood section. The important point to remember is the adjustability, detachability, and security of the entire unit in any position of the curtain, whether the bracket be clipped about the louvres or the rear edge of the hood, or bolted to the hood directly.

I claim:—

1. In a cover device for an automobile hood section having a plurality of vents therein, a support, a roller mounted in said support, a curtain carried by said roller and adapted to provide variable ventilation adjustment by selective closing of the vents in the hood section, means secured to said supports for maintaining said curtain in all operative positions at a given distance from the hood section, and means for securing said support to the hood section.

2. In a cover device for an automobile hood section having a plurality of vents therein, a support, a roller mounted in said support, an extendable curtain carried by said roller and adapted to cover the vents in the hood section to provide a variable degree of ventilation adjustment throughout a variable range of curtain extension, means secured to said support for maintaining said curtain at all times at a given distance from the hood section, and spring clips and a hook clamp engaging the hood on opposite sides of one edge of said support and exerting oppositely directed pulls on said support to secure said support to the hood section.

3. In a device of the type described a roller, a curtain mounted thereon, a support for said roller, and a single means associated with said support for maintaining the curtain in fixed relation to said support at one point and varying the relation between said support and said roller at another point.

4. In a device of the type described a roller curtain, a support therefor, and means associated with said support for maintaining the curtain in fixed relation to said support at one point and varying the relation between said roller and support at another comprising a tension rod, a guide portion on said rod adapted to guide the movement of said roller curtain, an arched portion at one end of said rod bearing upon one end of said support, and adjustable means at the other end of said rod for varying the magnitude of the bearing pressure of said arched portion upon said support, the end of said arched portion being disposed in closer proximity to the point at which the roller curtain is mounted in said support than the guide portion of said rod.

5. In a device of the type described means for securing a roller support to a hood section comprising a plurality of flexible spring clips looped at one side to said support, a hook clamp secured to said support, bent ends on said spring clips adapted to frictionally grip a hood section in one direction, a bent end on said hook clamp adapted to grip a hood section in the opposite direction, and means for increasing the tension between said spring clips and said hook clamp.

6. In a device of the type described a spring roller, a flexible curtain secured at one end to said roller, a slotted hook plate adjustably fastened to said curtain at its other end, a plurality of slits in said curtain at said hook plate end, a plurality of bent ears on said hook plate adapted to co-operate in different positions with said slits, and at least one bent ear on said hook plate adapted to catch in openings in a hood section to vary the extended length of said curtain.

7. In a device of the type described means for supporting a spring roller comprising a base portion having openings therein adapted to receive securing means for fastening it to an automobile hood section, end portions at right angles to said base portion having openings therein adapted to receive a spring roller in operative position, said end portions having further openings near said base portion adapted to receive tensioning means for varying the distance between said end portions at the spring roller openings, an inclined portion bent up from said base portion at one side, and a recess in said base portion opposite said inclined portion, said inclined portion having an opening therein adapted to receive an adjustable clamp as additional securing means for fastening said base portion to a hood section.

8. In a cover device for an automobile hood section having a plurality of vents therein, a support, a spring-roller mounted in said support, an extensible and retractible curtain secured to said roller and adapted to cover the vents in the hood section to provide a variable degree of ventilation adjustment throughout a variable range of curtain extension, means for maintaining said variably extendable curtain at a given distance from the hood section, and a pair of spring clips and a hook clamp engaging the hood on opposite sides of one edge of said support and exerting oppositely directed pulls on said support to secure said support to the hood section.

9. In a cover device for an automobile hood section having a plurality of vents in the hood section support, a spring roller mounted in said support, an extensible and retractible curtain secured to said roller and adapted to cover the vents to provide a variable degree of ventilation adjustment throughout a variable range of curtain extension, means secured to said support for maintaining said variably extendable curtain at a given distance from the hood section, and frictionally gripping spring clips and hook clamping means engaging the hood section on opposite sides of one edge of said support to secure said support to the inner surface of the hood section.

10. In a cover device for an automobile hood section having a plurality of vents therein, a support, a spring roller mounted in said support, an extensible and retractible curtain secured to said roller and adapted to cover the vents in the hood section to provide a variable degree of ventilation adjustment throughout a variable range of curtain extension, means secured to said support for maintaining said variably extendable curtain in fixed relation to the hood section, means looped to said support for frictionally gripping said hood section, and adjustable means co-operating with said frictionally gripping means for securely fastening said support to the inner surface of the hood section against the counter-action of said frictionally gripping means.

11. In a cover device for an automobile hood section having a plurality of vents therein, a bracket, a spring roller mounted in said bracket, an extensible and retractible curtain secured to said roller and adapted to cover the vents in the hood section to provide a variable degree of ventilation adjustment throughout a variable range of curtain extension, a guide rod secured to said bracket and positioned to maintain said variably extendable curtain in fixed relation to the hood section, spring clips looped to said bracket and frictionally gripping the hood section, and an adjustable hook clamp co-operating with the spring clips to securely fasten said bracket to the inner surface of the hood section against the tension of said clips.

In testimony whereof I affix my signature.

JAMES BINDON.

CERTIFICATE OF CORRECTION.

Patent No. 1,651,943.                                              Granted December 6, 1927, to

JAMES BINDON.

It is hereby certified that error appears in the printed specification of the above numbered patent requiring correction as follows: Page 4, lines 38 and 39, claim 9, strike out the words "in the hood section support"; and insert instead "therein, a support"; same page and claim, line 42, after the word "vents" insert the words "in the hood section"; and that the said Letters Patent should be read with these corrections therein that the same may conform to the record of the case in the Patent Office.

Signed and sealed this 17th day of January, A. D. 1928.

Seal.                                                                  M. J. Moore,
                                                                    Acting Commissioner of Patents.